Figure 1:
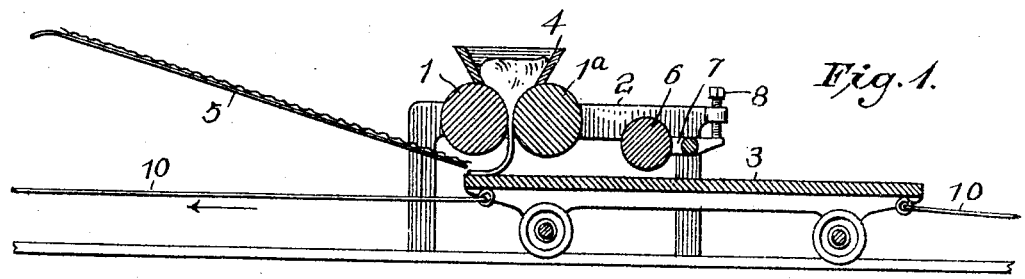

No. 805,610. PATENTED NOV. 28, 1905.
B. C. WHITE.
MANUFACTURE OF GLASS PLATES.
APPLICATION FILED JUNE 17, 1905.

2 SHEETS—SHEET 1.

Witnesses:
Herbert Bradley.
Charles Barnett.

Inventor,
Bruce Clark White
by Christy and Christy,
Attorneys.

No. 805,610. PATENTED NOV. 28, 1905.
B. C. WHITE.
MANUFACTURE OF GLASS PLATES.
APPLICATION FILED JUNE 17, 1905.

2 SHEETS—SHEET 2.

WITNESSES:
Herbert Bradley.
Charles Barnett.

INVENTOR
Bruce Clark White
by Christy and Christy,
Att'ys

UNITED STATES PATENT OFFICE.

BRUCE CLARK WHITE, OF MOSGROVE, PENNSYLVANIA.

MANUFACTURE OF GLASS PLATES.

No. 805,610. Specification of Letters Patent. Patented Nov. 28, 1905.

Application filed June 17, 1905. Serial No. 265,815.

*To all whom it may concern:*

Be it known that I, BRUCE CLARK WHITE, a citizen of the United States, residing at Mosgrove, in the county of Armstrong and State of Pennsylvania, have invented or discovered certain new and useful Improvements in the Manufacture of Glass Plates, of which improvements the following is a specification.

The invention described herein relates to certain improvements in the manufacture of glass plates, the improvements being especially applicable to the manufacture of compound plates having a metallic web or fabric embodied therein. The most general method now in practice for manufacturing such plates consists in spreading a mass of glass upon a bed or platen, superimposing upon such sheet a metal web or fabric, and then spreading a second mass of glass upon the metal web or fabric, thus embedding the latter between the two layers of glass. The foregoing statement covers substantially the methods now in practice, although there are some variations from such generally-stated method. A second method of forming such compound plates consists in forming two masses of glass in a sheet-like form and bringing them together on opposite sides of a metal web or fabric and subjecting the layers thus arranged in juxtaposition to pressure, preferably by the means of rolls.

It is characteristic of the first method and its several modifications that at each end of the sheets thus formed the glass will be rolled out of a less width than the main portion of the sheet and that the ends must be cut off before charging the compound sheet into the annealing-furnace. The cutting off of the rear end of the compound sheet can be done automatically and presents little difficulty and causes slight delay; but the cutting off of the front end involves considerable trouble and delay, which is highly undesirable, as it is necessary that the compound sheet should be placed in the annealing-furnace before any considerable reduction of the heat of the plate has occurred; otherwise the glass layers will crack along the lines of the metal web or fabric.

The object of the invention described herein is to provide for the reduction of a single mass or batch of glass to sheet form, and by depositing one portion of such sheet upon the other portion either with or without the interposition of wire fabric to form a plate of the desired thickness the doubling over or depositing of one portion of the sheet on the other can be effected either during the formation of the sheet or subsequent thereto.

Figure 2:
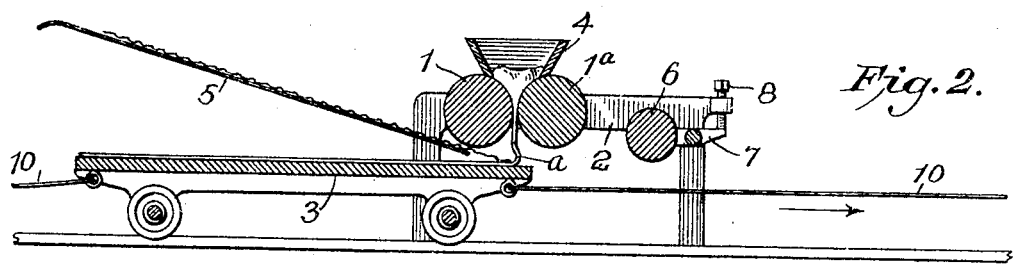
Figure 3:
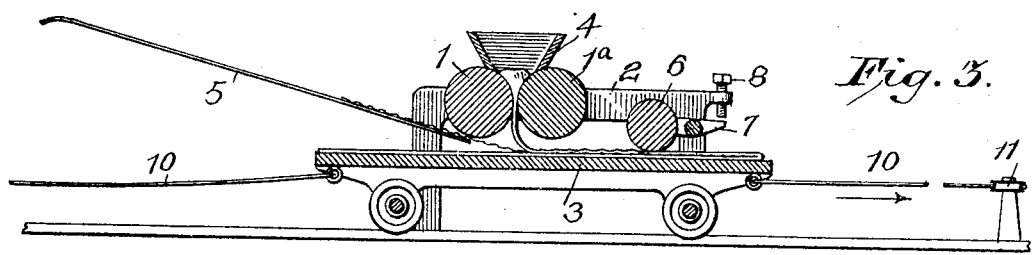
Figure 4:
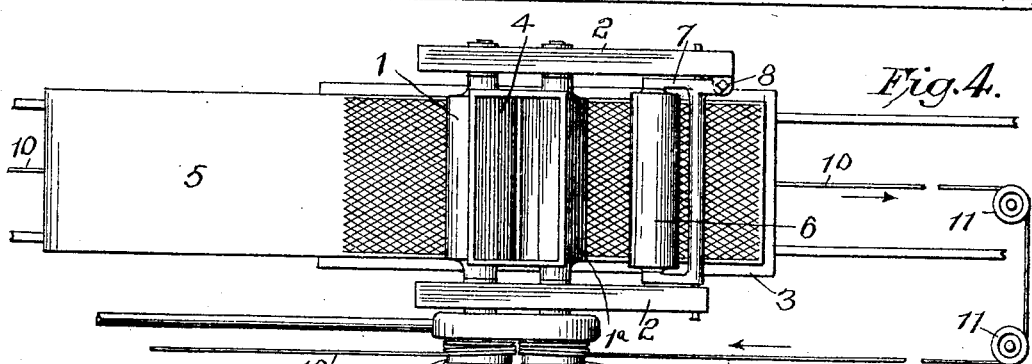
Figure 5:
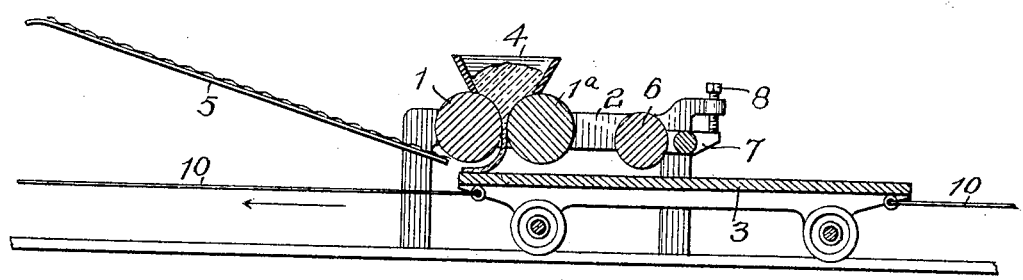
Figure 6:
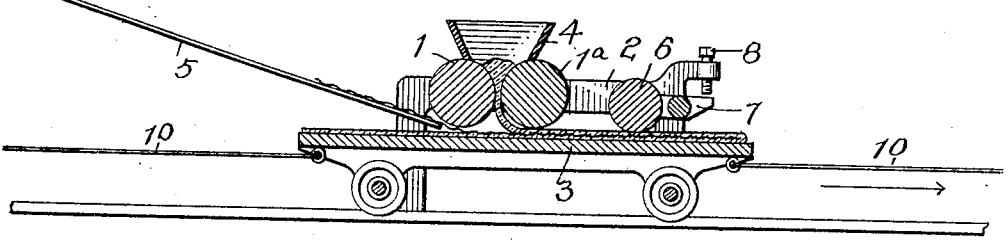
Figure 7:
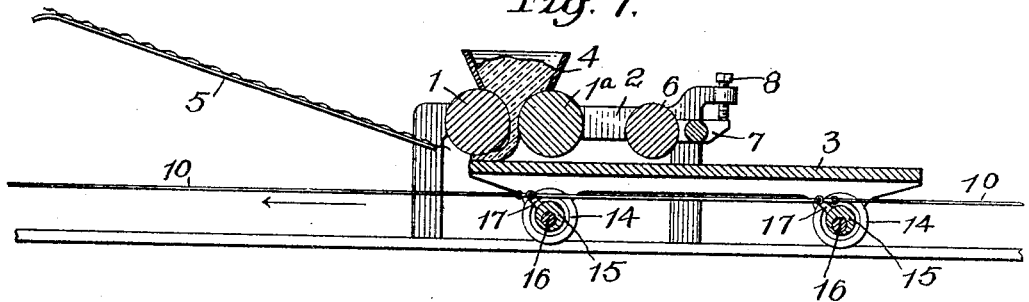
Figure 8:
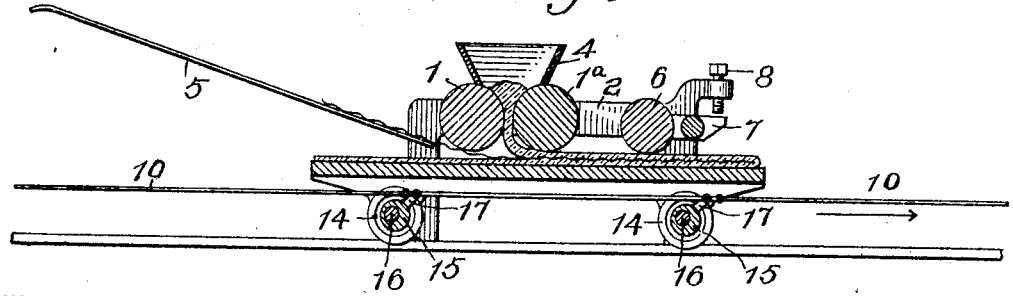

In the accompanying drawings, forming a part of this specification, Figures 1, 2, and 3 are sectional elevations of mechanism adapted for the practice of my invention, the parts of the mechanism being shown in different positions at different stages in the operation of forming the compound sheet. Fig. 4 is a top plan view of the machine. Figs. 5 and 6 are views similar to Figs. 1 and 3, illustrating a modification of the method; and Figs. 7 and 8 are sectional views illustrating modifications in my improvement.

In the practice of my invention I provide suitable means for the formation of a sheet of glass from a mass of molten glass, a desirable form of such means consisting of rolls 1 $1^a$, mounted in a suitable frame or support 2 and driven in any suitable manner known in the art. I further provide for the arrangement of the sheet as it is formed upon a suitable bed or support—as, for example, the platen 3. As the sheet is being formed one of these elements—*i. e.*, the sheet-forming mechanism or the support—are moved relative to each other, so that the sheet will be deposited uniformly along the bed or support. After the desired length of sheet has been produced the motion of the movable element is reversed, and it is moved in the opposite direction, the formation of the sheet being continued, so that after such reversal the sheet being formed is deposited upon the portion of the sheet first formed. On the reversal of the movable element a bend or fold in the sheet is produced, and when a compound plate having a metal fabric embedded therein is to be formed the end of such metal web or fabric is fed up to the fold or bend, and as the formation of the latter portion of the sheet proceeds the fabric or web is embedded between the two layers of glass. As the reversal occurs while the full width of sheet is being produced and as the web or fabric is fed up into the fold, there will be no protrusion or extension of glass of irregular form or dimensions at that end of the compound plate, and cutting or trimming is not required. Provision is made for cutting off the glass and wire fabric at the rear end of the sheet by any means known in the art. After the two portions of the sheet have been folded or formed one upon the other, as described, it is preferred that the layers of glass or glass and metal should be subjected to pressure, so as to smooth the upper surface, and in addition to the smoothing action the pressure will insure the adherence of the sheets one to the other. It should be understood, however, that ordinarily pressure beyond the weight of the upper layer is not necessary to obtain good adherence between the two layers.

In the form of apparatus shown a hopper 4 is provided above the rolls 1 and 1ᵃ of sufficient capacity to hold a mass of glass sufficient to form two layers or lengths, as described. The bed or platen 3 is caused to move back and forth under the rolls, the left-hand end being arranged in the plane of delivery of the rolls at the beginning of the operation. As the sheet is being formed the bed or platen is moved to the left, so that the sheet will be smoothly and evenly distributed thereon, and as the rear or right-hand end of the bed or platen reaches the plane of delivery of the rolls the motion of the bed or platen is reversed. At this time if a metal web or fabric is to be incorporated in the plate it is fed in so that the end thereof will come into the bend or fold $a$, formed by the reversal of the bed or platen, the fabric being guided and supported by suitable means, as the apron 5. The sheet of glass forming the bend or fold will serve as a stop for the metal fabric. As the bed or platen moves to the right the sheet being formed will be uniformly and evenly distributed or deposited upon the portion of the sheet first formed or on the metal fabric placed in position, as described. As the platen continues its movement to the right it will pass under a pressing-roller 6, which will compress the sheets tightly against each other, embedding the fabric, if used, deeply in the glass. The presser-roller is preferably mounted upon arms 7, pivotally mounted on the frame of the machine, and the degree of pressure to be exerted by the roller or the amount of reduction to be effected thereby is regulated by means of set-screws 8, bearing against the outer ends of the levers.

It will be readily understood by those skilled in the art that as the reversal of the bed or platen occurs while the sheet is being formed of full width the end of the sheet will be square and even and there will be no necessity of trimming such end. Provision can be made in accordance with practices well known in the art for severing and trimming the rear ends of the glass and fabric as they pass under the compressing-roller, so that the bed or platen, with its compound plate thereon, can be moved directly to the annealing-furnace and the plate delivered thereinto with the slightest or no delay.

While I have shown and described with some particularity a form of mechanism adapted to the practice of my invention, the claims are not limited as regards their broader terms to any specific form or construction of mechanism, as means other than those shown and described would readily suggest themselves to those skilled in the art. It is characteristic of my invention that a compound plate with or without a metal fabric is formed from a single mass of glass, and the reduction of the glass to sheet form is not materially interrupted during the operation of forming a plate.

Any suitable means can be employed for reciprocating the machine element, as the bed or platen 3. In the construction shown two drums 9 are mounted on the shafts of the rolls 1 1ᵃ, and ropes 10 extend therefrom around guide-pulleys 11 to the bed or platen. The drums are locked to the shafts alternately by suitable clutches 12, adapted to be shifted by the lever 13.

As shown in Figs. 5 and 6, provision may be made for causing one of the rolls 1 1ᵃ to bear upon the surface of the second portion or layer of glass. As this roller will be highly heated by contact with the mass of glass in the hopper, it will have a fire-surfacing action of the sheet and will also have a smoothing and spreading action on the second portion or layer. This result may be attained by arranging the rolls and bed and platen in such relation to each other that during the formation and distribution of the first portion or layer on the bed or platen neither of the rolls will contact therewith; but one of the rolls will bear upon the second layer more or less in accordance with the smoothing, &c., desired. If desired, the roller 6 may be employed.

In Figs. 7 and 8 is shown a further modification in which provision is made causing both rolls to act on the sheet after it has been deposited on the table. To this end provision is made for changing the relation of the rolls and platen by shifting one of said elements, as the platen, toward and from the other. The adjustment of the platen or bed can be effected by any suitable means—as, for example, by mounting the wheels 14 on eccentric sleeves 15, loosely mounted on the axles 16. The arms 17 for rotating the sleeves are connected together, so that the bed will rise or fall evenly and may be connected to the means employed for reciprocating the bed, thereby rendering the adjustment of the bed automatic at each end of its movement. The roll 1 will bear upon the first portion of the sheet after it has been deposited on the bed or platen, while the other roll will bear on the other portion or layer after it has been deposited on the first portion or layer, thereby affecting a smoothing of the surfaces, and by reason of the heat of the rolls the surfaces will have fire-polish. The rolls may also coöperate with the bed or platen to produce a spreading or reducing of the sheet. If desired, the rolls may be so adjusted that the sheet will not be reduced by them to the desired thickness, in which case the first layer or portion will be further reduced or spread by the conjoint action of the bed or platen and the roll 1 and the second layer or portion by the conjoint action of the other roll and the first layer or portion.

I claim herein as my invention—

1. The method herein described of making glass plates which consists in forming and distributing a portion of a sheet in one direction and another portion in the opposite direction and then pressing said portions together.

2. The method herein described of making glass plates, which consists in forming a portion of a sheet and forming the remaining portion on the first portion.

3. The method herein described of making glass plates, which consists in forming a glass sheet along a suitable bed or support and reversing the direction of distribution of the sheet without interrupting the formation thereof, thereby depositing a second portion of the sheet on the portion first formed.

4. The method herein described of making glass plates, which consists in forming a glass sheet along a suitable bed or support, placing a metallic web or fabric thereon and reversing the direction of distribution of the sheet without interrupting its formation, thereby inclosing the metal web or fabric between portions of a continuous sheet.

5. The method herein described which consists in forming a sheet doubling it on itself, interposing a metal fabric or web between the two portions of the sheet and subjecting the layers of glass and metal to pressure.

6. The method herein described which consists in forming a sheet doubling it on itself and interposing a metal fabric or web between the two portions of the sheet.

7. The method herein described which consists in reducing a portion of a mass of glass to sheet form, placing a metallic web or fabric on the sheet, forming another sheet from the same mass, depositing it on the metal web or fabric and subjecting the layers of glass and metal to pressure.

8. The method herein described which consists in reducing a portion of a mass of glass to sheet form, placing a metallic web or fabric on the sheet and forming another sheet from the same mass, depositing it on the metal web or fabric.

9. In an apparatus for the manufacture of glass plates, the combination of means for reducing a mass of glass to sheet form, a support for the sheet as formed, means for imparting a back-and-forth movement to one of said elements during the reduction of the glass to sheet form.

10. In an apparatus for the manufacture of glass plates, the combination of means for reducing a mass of glass to sheet form, a support for the sheet as formed, means for imparting a back-and-forth movement to one of said elements during the formation of the sheet and means for placing a metal web or fabric on the portion of the sheet first formed.

11. In an apparatus for the manufacture of glass plates the combination of means for reducing a mass of glass to sheet form, a support for the sheet as formed, means for imparting a back-and-forth movement to one of said elements during the reduction of the glass to sheet form and means for compressing the layers thus formed.

12. In an apparatus for the manufacture of glass plates the combination of a pair of rolls for reducing a mass of glass to sheet form, a movable bed or platen and means for imparting a back-and-forth movement to the bed or platen during the formation of a sheet and a pressing-roll.

In testimony whereof I have hereunto set my hand.

BRUCE CLARK WHITE.

Witnesses:
CHARLES BARNETT,
HERBERT BRADLEY.